No. 684,720. Patented Oct. 15, 1901.
R. T. REID.
STANCHION.
(Application filed Mar. 19, 1901.)
(No Model.)

WITNESSES:
W. R. Edelin.
Amos W Hart.

INVENTOR
Robert T. Reid.
BY Munn & Co
ATTORNEYS

UNITED STATES PATENT OFFICE.

ROBERT T. REID, OF TACOMA, WASHINGTON, ASSIGNOR OF ONE-HALF TO JAMES L. McDONNELL, OF SAME PLACE.

STANCHION.

SPECIFICATION forming part of Letters Patent No. 684,720, dated October 15, 1901.

Application filed March 19, 1901. Serial No. 51,914. (No model.)

*To all whom it may concern:*

Be it known that I, ROBERT T. REID, of Tacoma, in the county of Pierce and State of Washington, have invented a new and useful Improvement in Stanchions, of which the following is a specification.

As ordinarily constructed and arranged the stanchions between which the heads of horned cattle are secured do not permit them due freedom of position or movement when lying down or getting up. I have devised an improvement which is free from these objections and is at the same time strong, cheap, and adapted to be easily applied in old or new stalls. The construction and arrangement of the same are as follows.

Figure 1:
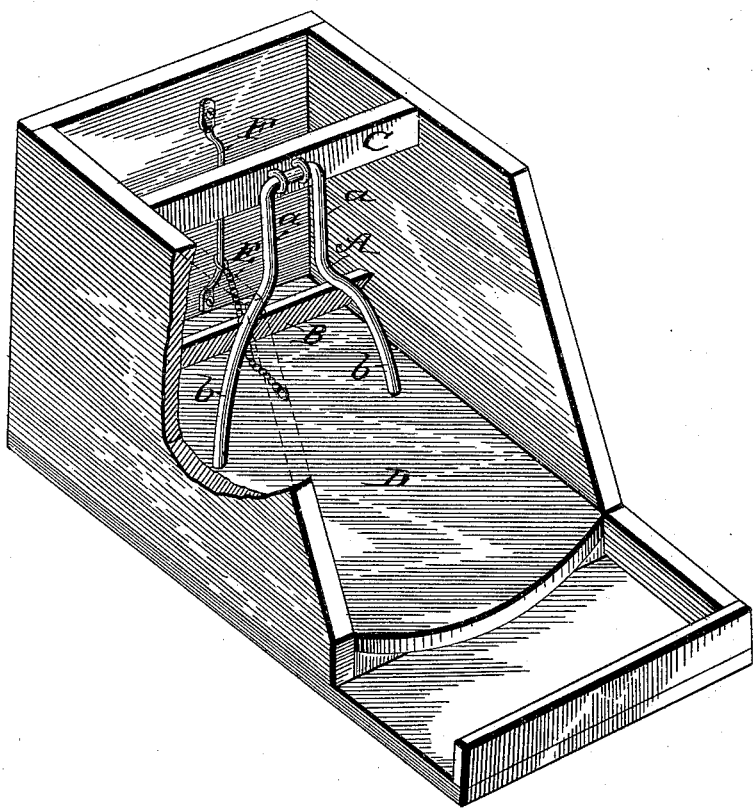
Figure 2:
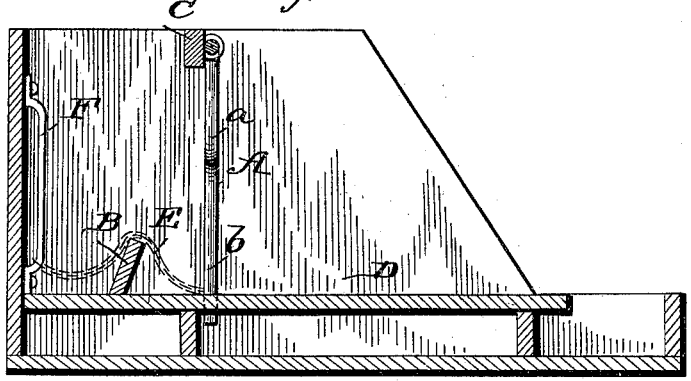

In the accompanying drawings, Figure 1 is a perspective view of a stall provided with my improved stanchion. Fig. 2 is a central longitudinal section of the stall.

My stanchion A is arranged vertically in front of the manger B. It preferably consists of a single stout iron rod bent at the middle of its length and having a peculiar form. It is secured at its upper end to a transverse beam C, arranged above and in front of the manger B, while its lower ends enter the floor D of the stall. The upper portion $a$ of the stanchion is narrow and has preferably parallel sides, while the lower portion $b$ is much wider and formed on divergent curved lines. Thus the upper portion $a$ is adapted to receive and allow free vertical movement of a bullock's neck, but would prevent forward movement of its body, while the lower portion $b$ allows great freedom of movement of the bullock laterally or forward and back. For this purpose I make the lower portion $b$ about three times the width of the upper one. Thus when a bullock is standing and duly secured by a chain or rope E to the head of the manger its neck occupies the narrow part $a$, and in lying down or getting up no obstruction is offered to the requisite forward or rearward movement of its body, so that there is no danger of the animal being thrown upon its haunches, as in the case of stanchions of the usual construction.

The spread or width of the lower portion $b$ of the stanchion also permits the animal to lie comfortably with its body and especially its neck at different angles without contact with the stanchion.

The chain E is attached to a vertical bar F by means of a sliding ring, so that it in no way limits the bullock's movement save to prevent him withdrawing his head from the stanchion. The length of the chain is such that it extends to the stanchion A, or thereabout.

I may construct the stanchion of solid or tubular iron and of more than one piece, although the construction in one piece, as shown, is the preferable form on account of cheapness, strength, and facility of attachment to the beam C and floor D.

What I claim is—

1. The improved stanchion formed of a single metal rod bent at the middle, the upper portion being narrow and having parallel sides, and its lower portion being wider as shown and described.

2. The combination with the stall, having a transverse bar arranged as shown, of the stanchion secured at one end to said bar and at its foot to the floor, the said stanchion being narrow in its upper portion and wider in its lower portion, substantially as shown and described.

3. The combination with a stall and manger, and a rod arranged vertically at the back of the manger, of a stanchion arranged in front of the manger and having a narrow upper portion and wider lower portion, and a chain having a sliding attachment with said rod, and of a length which practically extends to the stanchion, substantially as shown for the purpose specified.

4. The combination with a stall of a vertical stanchion whose upper portion is made narrow, so as to receive and allow due freedom of movement of a bullock's neck while preventing the forward movement of its body, and whose lower portion has two or more times the width of the upper one, to allow free lateral and vertical movement of the animal's neck and body, as described.

5. The combination with a stall and manger, and a transverse beam, arranged above the manger, of the stanchion consisting of a metal bar and arranged vertically, its upper end being secured to said beam and made narrow, with parallel sides, and its lower portion being secured to the stall-floor and formed on divergent lines so that it has at least twice the width of the upper portion, as shown and described.

ROBERT T. REID.

Witnesses:
WM. J. MEADE,
GEO. T. REID.